United States Patent Office 3,004,423
Patented Oct. 17, 1961

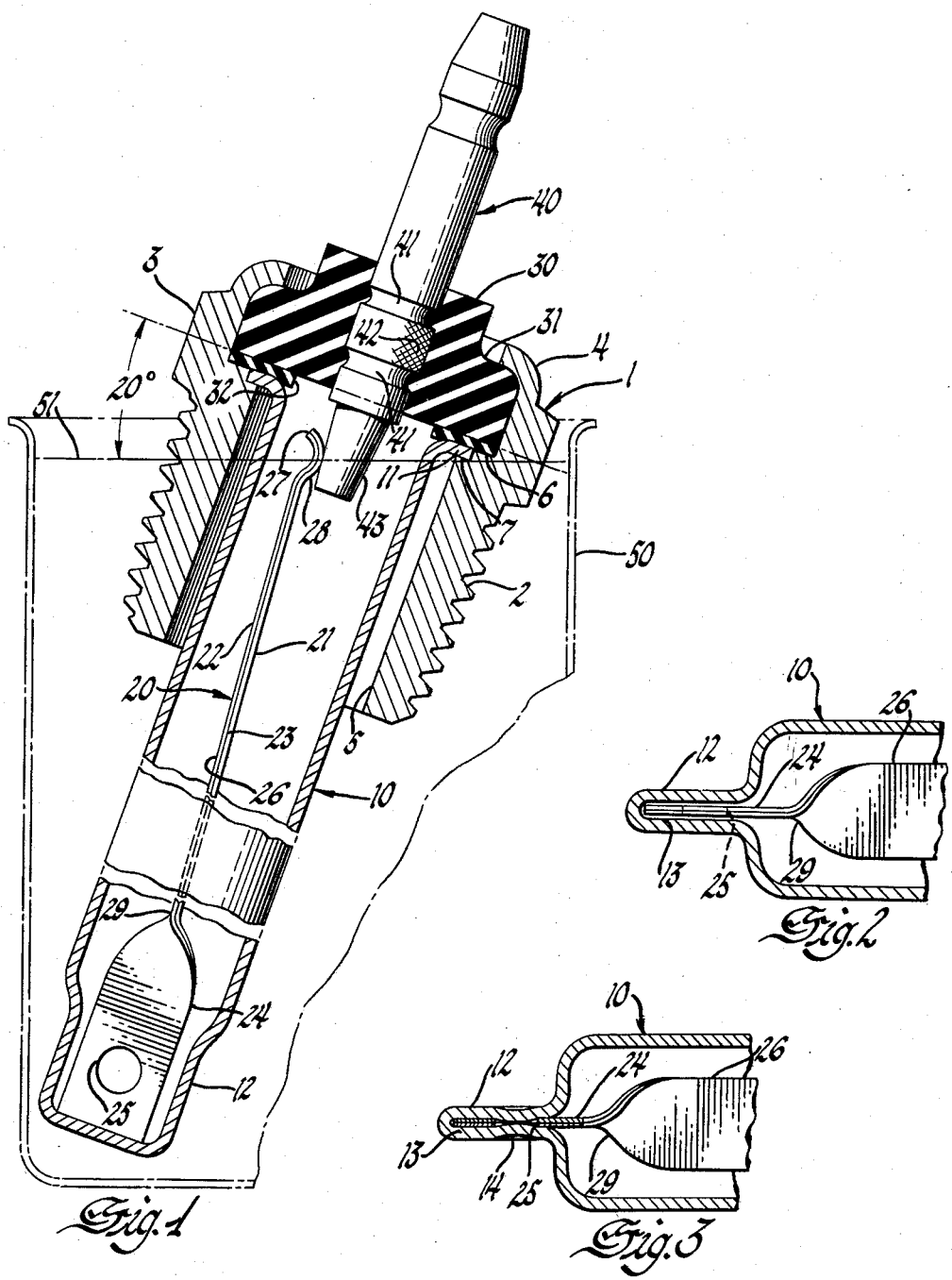

3,004,423
THERMOSTATIC SWITCH
Bertil H. Clason, Flint, Mich., assignor to General Motors Corporation, Detroit, Mich., a corporation of Delaware
Filed May 26, 1955, Ser. No. 511,274
2 Claims. (Cl. 73—1)

This invention relates to temperature responsive devices and more particularly to thermostatic switches of the type which utilize a bimetal temperature sensing element.

The application of bimetal temperature responsive devices is wide-spread especially in the form of electrical switches for providing an electrical signal for temperature indication or control. A typical application is found in conjunction with automotive vehicles for sensing engine temperatures. The temperature condition of a vehicle engine is a vital operating parameter and it is, therefore, important to provide accurate measurement thereof to assure efficient and safe engine operation. This measurement may be suitably translated to an electrical signal for utilization in automatic temperature control apparatus or in indicating apparatus to apprise the operator of the engine temperature. The indicating apparatus is commonly in the form of a meter providing continuous indication or a signal lamp affording the operator a warning upon the occurrence of temperature extremes.

In application to automotive vehicles, the temperature sensing device must meet rigid requirements. It must be of rugged construction, reliable and accurate in operation, and economical to manufacture. Accordingly, it is an object of this invention to provide a temperature responsive device which meets these requirements.

A more particular object of this invention is to provide a thermostat of the bimetal type in which accurate calibration is effected simultaneously with assembly.

A further object is to provide a thermostatic switch utilizing a bimetal contact arm which permits simultaneous assembly and calibration and affords highly advantageous coaction between the electrical contacts.

A further object of the invention is to provide a method of assembly for bimetal type thermostats requiring a minimum number of assembly operations to afford accurate calibration and rugged construction.

An additional object is to provide a thermostatic switch of the bimetal type requiring few and simple parts which are adapted for assembly and calibration operations suitable for mass production techniques.

In the accomplishment of these objects there is provided a thermostatic switch of the bimetal type in which the bimetal element is securely mounted in a predetermined relation with associated parts while subjected to a given calibrating temperature. During assembly, the bimetal element is adjustably disposed with one end adjacent a support member and the other end, which may carry an electrical contact, adjacent a fixed contact member. The bimetal element is preferably twisted intermediate its ends and, at a given temperature and attitude of the parts, the one end is secured to the support member.

A more complete understanding of the invention may be had from the detailed description which follows taken with the accompanying drawings, in which:

FIGURE 1 is an elevation view in cross section of the inventive thermostatic switch.

FIGURE 2 is a fragmentary view in cross section showing the relation of parts in one stage of assembly.

FIGURE 3 is a fragmentary view similar to FIGURE 2 showing the relation of parts in another stage of assembly.

Referring now to the drawings there is shown an illustrative embodiment of the invention in a bimetal type thermostatic switch especially adapted for use as a temperature sensing device for an automotive vehicle engine. This switch is adapted to complete the continuity of an electrical circuit at a predetermined value of engine. This switch is adapted to complete the continuity member or adapter shell 1 which supports a casing or tube member 10 within which is supported a bimetal temperature sensing element 20. The casing member 10 is closed by an insulating member 30 through which extends an electrical terminal member 40 for cooperation with the bimetal element 20.

The mounting member or adapter shell 1, preferably constructed of metal such as brass, comprises a threaded sleeve portion 2 adapted for screw-thread engagement with an engine block (not shown) to support the thermostatic switch in operative position. The shell 1 also includes a tool receiving shoulder 3 to facilitate installation and a flange portion 4 for securing the parts of the assembly in fixed relation as will appear subsequently. The shell 1 defines an axial bore 5 and is provided with internal seating shoulders 6 and 7.

The casing or tube member 10, generally of tubular construction and preferably of a ductile metal such as brass, is supported by the shell 1. The casing 10 is disposed coaxially with the shell 1 by insertion into the bore 5 and is provided with a radial flange 11 seated against the internal shoulder 7. The flange 11 may be secured to shoulder 7 by soldering to provide a sealed joint if desired. The radial flange 11 defines an open end of the casing 10 whereas the opposite end of casing 10 terminates in a closed support portion 12. The casing 10 is suitably formed by a drawing operation to provide the closed tubular configuration and the support portion 12 is provided by suitable deformation to define an elongated opening or channel 13 extending transversely of the casing 10.

The bimetal temperature sensing element 20 comprises a pair of dissimilar metal strips 21 and 22 of different temperature coefficients of expansion which define an interface area of engagement 23. The bimetal element 20 is disposed within casing 10 and is formed with a base or mounting portion 24 defining an aperture 25 and an arm portion 26. The arm portion 26 terminates in a free end 27 which carries a movable contact 28. The movable contact 28 is preferably formed integrally with the arm portion 26 by a corrugation therein which extends transversely of the arm portion. The plane of the arm portion 26 and the plane of the support portion 24 are displaced angularly about the longitudinal axis of the bimetal element 20 forming a twisted configuration or bend 29 intermediate the ends thereof. Preferably, the angular displacement is such that the plane of the interface 23 in arm portion 26 is perpendicular to the plane of the interface 23 in support portion 24. The bimetal element 20 is inserted through the open end of the casing 10 and the mounting portion 24 is disposed within the channel 13 defined by the support portion 12. As shown in FIGURE 2, the dimensions of the channel 13 are such that the mounting portion 24 fits loosely therein. Thus, the bimetal element 20 is confined laterally but may be adjustably positioned in the casing 10 by pivotal or rocking movement in the plane of the support portion 24.

The open end of the casing 10 is closed by an insulating member 30 which is suitably a molded body of thermosetting phenolic plastic. The insulating member 30 is generally cylindrical and is provided with an axial shoulder 31. A sealing gasket 32 is interposed between insulating member 30 and the axial surfaces of shoulder 6 and flange 11. A terminal member or post 40 extends axially through the insulating member 30 and is formed with undercut portions 41 and knurled portion 42 to insure positive interlocking engagement with member 30. The terminal post 40 terminates in a fixed electrical contact member 43 of tapered or conical shape. The movable contact 28 of bimetal element 20 is positioned laterally adjacent the fixed contact 43 for engagement therewith. With the thermostatic switch parts in the previously described assembled relation, the flange 4 of the shell 1 is crimped over the shoulder 31 to securely retain the parts together and to seal the insulating member 30, shell 1, and casing 10 against gasket 32.

It will now be apparent that the thermostatic switch is adapted to complete and interrupt the continuity of the electrical circuit extending from the terminal post 40, through fixed contact 43, movable contact 28, bimetal element 20, and casing 10 to metal shell 1. It remains however, to describe the manner in which the switch is calibrated to cause switch operation at a predetermined temperature value.

In accordance with one aspect of the present invention, the thermostatic switch is calibrated for operation at a predetermined temperature simultaneously with a final step of assembly. As shown diagrammatically in FIGURE 1, the casing 10 of the thermostatic switch is immersed in a temperature controlled medium such as liquid bath 51 contained in a suitable receptacle 50. The liquid bath 51 is maintained at the temperature value which is to be effective to cause switch operation and the parts of the switch are permitted to reach temperature equilibrium with the bath. The switch is positioned with its longitudinal axis tilted or displaced angularly from the vertical direction in the plane of the mounting portion 24. The proper attitude is that in which the movable contact 28 assumes, under the influence of gravity, a position of engagement with fixed contact 43. Since the bimetal element 20 is constrained by mounting portion 24 in channel 13 against lateral displacement, engagement of the contacts 28 and 43 is assured by rocking movement of the bimetal element about the mounting portion 24. As a typical example, an angular inclination of approximately 20 degrees has been found to produce the desired effect. The desired condition of engagement between contacts 28 and 43 can be readily detected by a simple electrical continuity testing circuit (not shown) connected across terminal post 40 and shell 1 or other suitable means.

When the desired condition is obtained the mounting portion 24 is secured in place to the support portion 12 of the casing 10. This may be accomplished by deforming or crimping the support portion 12 into engagement with mounting portion 24. As shown in FIGURE 3, the support portion 12 is preferably deformed into the opening 25 to insure a positive interlocking of the parts. The calibration of the thermostatic switch assembly is thus effected to provide switch operation at the desired predetermined temperature value.

In operation, the thermostatic switch of the illustrative embodiment is adapted to control the electrical continuity of a circuit extending from the terminal post 40 to fixed contact 43, movable contact 27, casing 10, and shell 1. When the switch is subjected to a temperature lower than calibration temperature, the movable contact 28 is displaced from fixed contact 43 by virtue of the differential expansion of metallic strips 21 and 22. Thus the continuity of the circuit at temperatures below calibration temperature is interrupted. Upon an increase of temperature, the bimetal element 20 is subjected to displacement and the motion of contact 28 may be resolved into two components of motion. One component is perpendicular to the plane of the interface 23 in the arm portion 26 and its direction is normal to contact 28. The other component is perpendicular to the plane of the interface 23 in the mounting portion 24 and is directed laterally of the contact 43. The relative magnitudes of these two components of motion depends upon the position of the bend 29 between the mounting portion 24 and contact 28. In the illustrative embodiment, the bend is disposed relatively close to the support portion 24 and, therefore, the normal component of displacement is greater than the lateral component of displacement. The lateral component of displacement is effective to provide a wiping action during engagement and disengagement of the movable contact 28 and the fixed contact 43. This wiping action maintains the contact surfaces free from particle accumulation and insures uniformly good electrical contact. When the temperature has increased to the predetermined calibration value, the movable contact 28 will just engage the fixed contact 43 and the circuit continuity will be completed. Upon the occurrence of a temperature value less than the calibration value, the displacement of the bimetal element 20 will separate contacts 28 and 43 and the circuit continuity will be interrupted.

This invention has been described with respect to a particular embodiment which is to be considered illustrative only and is not to be construed in a limiting sense. Numerous modifications and variations within the spirit and scope of the invention will now occur to those skilled in the art. For a definition of the invention, reference is made to the appended claims.

I claim:

1. The method of making a thermostatic switch comprising the steps of twisting a bimetal strip about its longitudinal axis at a point intermediate its ends so that the plane of one end is perpendicular to the plane of the other end, forming an electrical contact on one end and opening at the other end of the bimetal strip, forming a metal tube with an open end and with a flattened closed end which will receive said other end of said strip with sufficient clearance to permit pivotal motion of the strip in the plane of said other end, inserting said strip inside the tube with said other end extending into the flattened end of the tube, securing a fixed electrical contact in fixed relation to, and electrically insulated from, the tube near the open end thereof at a point opposite the electrical contact on the bimetal strip, disposing the aforesaid assembly in a temperature controlled medium, tilting the assembly away from the vertical position in the plane of said other end of the bimetal strip so that the strip falls toward the fixed electrical contact causing engagement of said contacts, and deforming said flattened end of the tube against the said one end of the bimetal strip in a direction perpendicular to said plane and in the region of said opening to secure it in fixed position relative to the tube.

2. The method of making a thermostatic switch comprising the steps of twisting a bimetal strip about its longitudinal axis at a point intermediate its ends so that the plane of one end is perpendicular to the plane of the other end, forming an electrical contact on said one end of the bimetal strip, forming a metal tube with an open end and with a flattened closed end which will receive said other end of said strip with sufficient clearance to permit pivotal motion of the strip in the plane of said other end, inserting said strip inside the tube with said other end extending into the flattened end of the tube, securing a fixed electrical contact in fixed relation to the tube near the open end thereof at a point opposite the electrical contact on the bimetal strip, disposing the aforesaid assembly in a temperature controlled medium, pivoting the bimetal strip about said other end in said plane to urge said contacts into engagement, and deforming said flattened end of the tube against said other end of the strip in a direction perpendicular to said plane thereof, to secure said other end of the strip in fixed position relative to the tube.

(References on following page)

References Cited in the file of this patent

UNITED STATES PATENTS

| | | |
|---|---|---|
| 1,661,323 | Crosthwait | Mar. 6, 1928 |
| 1,938,929 | Peterson | Dec. 12, 1933 |
| 2,357,353 | Pearce | Sept. 5, 1944 |
| 2,526,713 | Underwood | Oct. 24, 1950 |
| 2,571,643 | Youhouse | Oct. 16, 1951 |
| 2,574,192 | Samuel | Nov. 6, 1951 |
| 2,671,143 | Stelzer et al. | Mar. 2, 1954 |
| 2,724,961 | Logue | Nov. 29, 1955 |
| 2,792,474 | Dales | May 14, 1957 |

FOREIGN PATENTS

| | | |
|---|---|---|
| 631,889 | Great Britain | Nov. 11, 1949 |

UNITED STATES PATENT OFFICE
CERTIFICATE OF CORRECTION

Patent No. 3,004,423                  October 17, 1961

Bertil H. Clason

It is hereby certified that error appears in the above numbered patent requiring correction and that the said Letters Patent should read as corrected below.

Column 2, lines 8 and 9, for "engine. This switch is adapted to complete the continuity" read -- temperature. In general, it comprises a mounting --.

Signed and sealed this 10th day of April 1962.

(SEAL)
Attest:

ERNEST W. SWIDER
Attesting Officer

DAVID L. LADD
Commissioner of Patents